United States Patent
Panwar et al.

(10) Patent No.: US 9,467,934 B1
(45) Date of Patent: Oct. 11, 2016

(54) METHODS AND SYSTEMS FOR LOCATING NEAREST BLUETOOTH BEACONS

(71) Applicants: Bhupendra Singh Panwar, Indore (IN); Deepika Ganesan, Nellore (IN)

(72) Inventors: Bhupendra Singh Panwar, Indore (IN); Deepika Ganesan, Nellore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/746,485

(22) Filed: Jun. 22, 2015

(30) Foreign Application Priority Data

Mar. 28, 2015 (IN) .......................... 1599/CHE/2015

(51) Int. Cl.
- H04B 7/00 (2006.01)
- H04W 48/00 (2009.01)
- H04W 4/00 (2009.01)
- H04W 48/16 (2009.01)

(52) U.S. Cl.
CPC ............. *H04W 48/17* (2013.01); *H04W 4/008* (2013.01); *H04W 48/16* (2013.01)

(58) Field of Classification Search
CPC ... H04W 48/17; H04W 4/008; H04W 48/16; H04W 48/20
USPC ............ 455/41.1, 41.2, 513, 73, 134, 161.3, 455/226.2
See application file for complete search history.

(56) References Cited

U.S. PATENT DOCUMENTS

| | | | |
|---|---|---|---|
| 6,529,164 B1 | 3/2003 | Carter | |
| 7,312,752 B2 | 12/2007 | Smith et al. | |
| 7,751,829 B2 | 7/2010 | Masuoka et al. | |
| 7,924,149 B2 | 4/2011 | Mendelson | |
| 7,986,661 B2* | 7/2011 | Bhattacharjee | H04W 24/10 370/252 |
| 8,023,468 B2 | 9/2011 | Liu et al. | |
| 8,334,901 B1 | 12/2012 | Ganick et al. | |
| 8,593,277 B2 | 11/2013 | Nath et al. | |
| 8,738,024 B1 | 5/2014 | Kerr et al. | |
| 2006/0290519 A1 | 12/2006 | Boate et al. | |
| 2011/0065391 A1* | 3/2011 | Shiotsuki | H04B 7/0615 455/63.4 |
| 2013/0176869 A1* | 7/2013 | Finlow-Bates | H04W 52/0254 370/252 |
| 2014/0087752 A1 | 3/2014 | Zhu et al. | |
| 2014/0135041 A1 | 5/2014 | Buchheim et al. | |
| 2014/0135042 A1 | 5/2014 | Buchheim et al. | |
| 2014/1013241 | 5/2014 | Buchheim et al. | |

FOREIGN PATENT DOCUMENTS

| | | |
|---|---|---|
| CN | 102209379 | 8/2013 |
| EP | 1631790 B1 | 4/2013 |
| EP | 2733502 A1 | 5/2014 |
| WO | WO 95/03553 | 2/1995 |

* cited by examiner

*Primary Examiner* — Tuan Pham
(74) *Attorney, Agent, or Firm* — Finnegan, Henderson, Farabow, Garrett & Dunner, L.L.P.

(57) ABSTRACT

This disclosure relates generally to Bluetooth beacons and more particularly to methods and system for locating nearest Bluetooth beacons. In one embodiment, a method for locating a nearest Bluetooth beacon within a plurality of Bluetooth beacons is disclosed. The method includes identifying a latest highest Received Signal Strength Indication (RSSI) value Bluetooth beacon associated with a highest RSSI value from within a set of latest scanned Bluetooth beacons. The method further includes computing at least one average RSSI value for a predefined number of RSSI value detections associated with at least one Bluetooth beacon within a latest and previous set of scanned Bluetooth beacons. Thereafter, the method includes identifying a highest average RSSI value Bluetooth beacon from within the latest and previous set of scanned Bluetooth beacons.

22 Claims, 6 Drawing Sheets

Exemplary Environment

FIG. 1: Exemplary Environment

FIG. 2: Method For Locating A Nearest Bluetooth Beacon

FIG. 3A: Method For Locating A Nearest Bluetooth Beacon Another Embodiment

FIG. 3B: Method For Locating A Nearest Bluetooth Beacon Another Embodiment

FIG. 4: System For Locating A Nearest Bluetooth Beacon

FIG. 5: Exemplary Computer System

METHODS AND SYSTEMS FOR LOCATING NEAREST BLUETOOTH BEACONS

PRIORITY CLAIM

This U.S. patent application claims priority under 35 U.S.C. §119 to Indian Application No. 1599/CHE/2015, filed on Mar. 28, 2015. The aforementioned application is incorporated herein by reference in its entirety.

TECHNICAL FIELD

This disclosure relates generally to Bluetooth beacons and more particularly to methods and system for locating nearest Bluetooth beacons.

BACKGROUND

Bluetooth beacons are rapidly emerging as technology for indoor navigation and positioning. The Bluetooth beacons are used to provide proximity and context specific information to mobile devices. Examples of the mobile devices may include, but are not limited to smartphones, tablets, phablets, and Laptops. Bluetooth beacon transmits a signal using Bluetooth Low Energy (BLE). This signal contains a unique identifier for that Bluetooth beacon. However, to ensure relevancy of the information transmitted to the mobile device, the Bluetooth beacon that is nearest to the mobile device needs to be accurately determined.

In conventional methods and systems, Received Signal Strength Indication (RSSI) value is used to detect the nearest Bluetooth beacon. However, RSSI values depend on a plurality of factors that may include transmitted power, receive sensitivity, antenna used, physical obstacles to the radio wave propagation, distance between the transmitter and the receiver, signal interference, and orientation of the antenna. As a result, Bluetooth beacons may have inconsistent or varying RSSI values resulting in inaccurate identification of nearest Bluetooth Beacon.

SUMMARY

In one embodiment, a method for locating a nearest Bluetooth beacon within a plurality of Bluetooth beacons. The method includes identifying a latest highest Received Signal Strength Indication (RSSI) value Bluetooth beacon associated with a highest RSSI value from within a set of latest scanned Bluetooth beacons; computing at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons; identifying a highest average RSSI value Bluetooth beacon from within the latest and previous set of scanned Bluetooth beacons, the highest average RSSI value Bluetooth beacon being associated with a highest average RSSI value within the at least one average RSSI value; and selecting the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

In another embodiment, mobile device for locating a nearest Bluetooth beacon within a plurality of Bluetooth beacons. The mobile device comprising at least one processor; and a computer-readable medium storing instructions that, when executed by the at least one processor, cause the at least one processor to perform operations comprising: identifying a latest highest RSSI value Bluetooth beacon associated with a highest RSSI value from within a set of latest scanned Bluetooth beacons; computing at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons; identifying a highest average RSSI value Bluetooth beacon from within the latest and previous set of scanned Bluetooth beacons, the highest average RSSI value Bluetooth beacon being associated with a highest average RSSI value within the at least one average RSSI value; and selecting the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

In yet another embodiment, a system for locating a nearest Bluetooth beacon within a plurality of Bluetooth beacons. The system includes a mobile device configured to identify a latest highest RSSI value Bluetooth beacon associated with a highest RSSI value from within a set of latest scanned Bluetooth beacons; compute at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons; identify a highest average RSSI value Bluetooth beacon from within the latest and previous set of scanned Bluetooth beacons, the highest average RSSI value Bluetooth beacon being associated with a highest average RSSI value within the at least one average RSSI value; and select the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon. The system further includes a server in communication with the mobile device configured to predict a set of possible nearest Bluetooth beacons based on Bluetooth beacon sequence data, lost-found beacon data, and a set of detected nearest Bluetooth beacons, when the latest highest RSSI value Bluetooth beacon is different from the highest average RSSI value Bluetooth beacon, the Bluetooth beacon sequence data being representative of arrangement of the plurality of Bluetooth beacons.

In another embodiment, a non-transitory computer-readable storage medium for locating a nearest Bluetooth beacon within a plurality of Bluetooth beacons, when executed by a computing device, cause the computing device to identify a latest highest RSSI value Bluetooth beacon associated with a highest RSSI value from within a set of latest scanned Bluetooth beacons; compute at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons; identify a highest average RSSI value Bluetooth beacon from within the latest and previous set of scanned Bluetooth beacons, the highest average RSSI value Bluetooth beacon being associated with a highest average RSSI value within the at least one average RSSI value; and select the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, an exemplary environment 100 in which various embodiments may function is disclosed in FIG. 1. Environment 100 includes a mobile device 102. Examples of a mobile device may include but are not limited to a cell phone, a smart phone, a tablet, a phablet, and a laptop. When a user of mobile device 102 is moving around in an area, for example, a retail mall or a shopping center, mobile device 102 may interact with a plurality of Bluetooth beacons, for example, a Bluetooth beacon 104, a Bluetooth beacon 106, a Bluetooth beacon 108, a Bluetooth beacon 110, and a Bluetooth beacon 112. The plurality of Bluetooth beacons are placed within the premises of the area, such that, they create proximity zones based on their transmission power and these proximity zones are further mapped to premise locations. By way of an example, Bluetooth beacon 104 may be placed outside a provisional store. In this case, when mobile device 102 comes within close proximity of Bluetooth beacon 104 and identify it as a nearest Bluetooth beacon, mobile device 102 may notify a server 114 about nearest Bluetooth beacon identity and server 114 may provide offers or coupons related to the provisional store to mobile device 102 in order to attract attention of the user. By way of another example, Bluetooth beacon 108 may be place outside an electronic store. In this case, identity of Bluetooth beacon 108 can be used to notify server 114 in order to enable server 114 to provide offers related to electronic items in the electronic store to mobile device 102.

Figure 1:
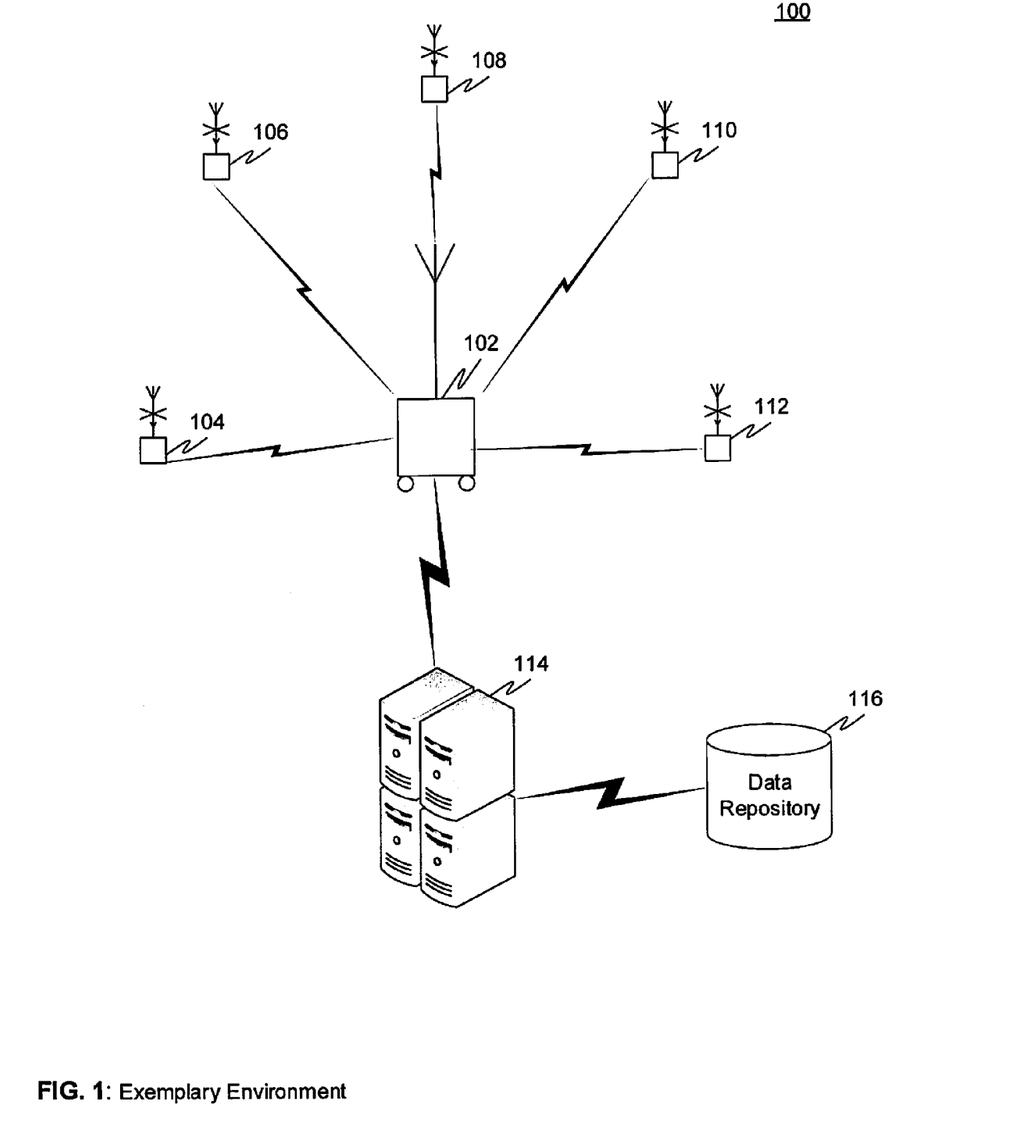
FIG. 1 discloses an exemplary environment in which various embodiments may function.

Each of the plurality of Bluetooth beacons communicate with mobile device 102 using Bluetooth Low Energy (BLE) signal that includes a unique identifier for a particular Bluetooth beacon. By way of an example, a unique ID may be 20 bytes long and is divided into three sections. These three sections include a proximity Universally Unique Identifier (UUID) of 16 bytes, a major number of two bytes, and a minor number of two bytes. A unique ID, for example, may be represented as: c2d360a002a601315add1040f3913c300102. It will be apparent to a person skilled in the art that communication protocol used by the plurality of Bluetooth beacons is not limited to BLE and may be extended to any other Radio Frequency (RF) protocol.

Mobile device 102 further communicates with server 114 to share information regarding proximity zone of mobile device 102 within the area based on communication established between mobile device 102 and the plurality of Bluetooth beacons. Based on this proximity zone information which in turn is mapped to a location, server 114 may push contextual advertisements onto mobile device 102. By way of an example, when the user of mobile device 102 is standing near an electronic store and Bluetooth beacon 108 is detected as being nearest to mobile device 102, mobile device 102 communicates this information to server 114. Accordingly, in this example, server 114 may push advertisements related to Laptops of popular brands onto mobile device 102 for consumption by the user. Server 114 may communicate with a data repository 116 to extract advertisement information based on the detected nearest Bluetooth beacon. Data repository 116 stores mapping information of Bluetooth beacons to corresponding locations. Additionally, server 114 may also extract user specific information from data repository 116 to push contextual advertisement to mobile device 102. The user specific information may include but is not limited to user's demographic data, credit card expenditure information, history of past purchases, and user's interests and hobbies.

Figure 2:
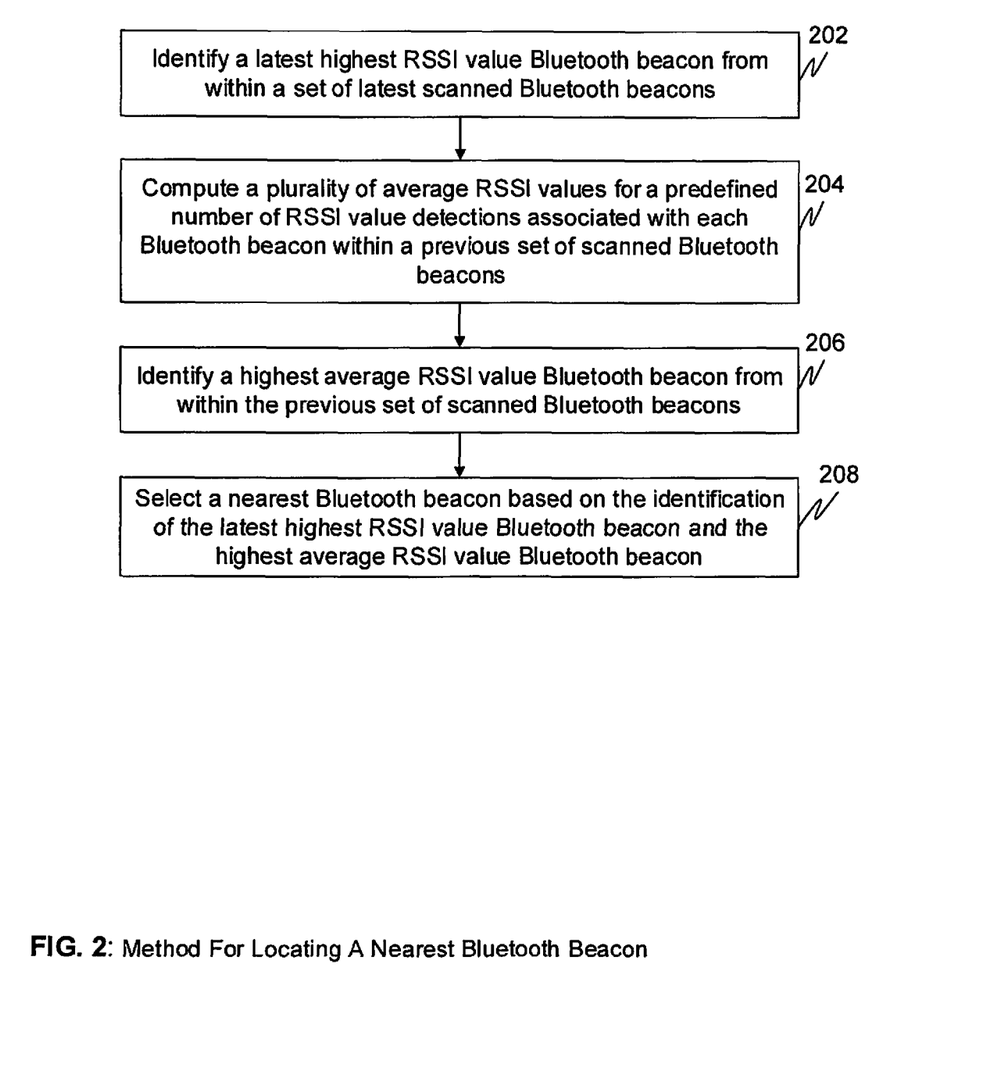
FIG. 2 illustrates a flowchart of a method for locating a nearest Bluetooth beacon within a plurality of Bluetooth beacons, in accordance with an embodiment.

FIG. 2 illustrates a flowchart of a method for locating a nearest Bluetooth beacon within a plurality of Bluetooth beacons, in accordance with an embodiment. A particular area, for example, a shopping center or a Mall, may include the plurality of Bluetooth beacons, which have been placed at specific places inside that area. This placement of the plurality of Bluetooth beacons is also called Floor map data or Bluetooth beacon sequence data. When a user carrying a mobile device enters a particular section within the area, the mobile device determines the latest Received Signal Strength Indication (RSSI) value for each Bluetooth Beacon in a set of latest scanned Bluetooth beacons. By way of an example, the set of latest scanned Bluetooth beacons include Bluetooth beacon 104, Bluetooth beacon 106, and Bluetooth beacon 108. In this case, the mobile device determines the latest RSSI values for Bluetooth beacon 104 as −80 dB, for Bluetooth beacon 106 as −40 dB, and for Bluetooth beacon 108 as −20 dB. Thereafter, at 202, the mobile device identifies a latest highest RSSI value Bluetooth beacon from within the set of latest scanned Bluetooth beacons, which has the highest RSSI value. In the example above, the mobile device identifies Bluetooth beacon 108 as the Bluetooth beacon for which the latest RSSI value is highest, i.e., −20 dB.

When the user is moving around within the area, Bluetooth beacons that the mobile device detects may keep on changing. Thus, the mobile device at a previous time instance would have detected a previous set of scanned Bluetooth beacons. However, one or more Bluetooth beacons may be common in the set of latest scanned Bluetooth beacons and the previous set of scanned Bluetooth beacons. For example, the previous set of scanned Bluetooth beacons includes Bluetooth beacon 108, Bluetooth beacon 110, and Bluetooth beacons 112. Thus, in this example, Bluetooth beacon 108 is common in the set of latest scanned Bluetooth beacons and the previous set of scanned Bluetooth beacons. In an embodiment, when the user is in the same proximity, the set of latest scanned Bluetooth beacons is the same as the previous set of scanned Bluetooth beacons. In other words, the mobile device detects the same Bluetooth beacons at two different time instants. In another embodiment, the set of latest scanned Bluetooth beacons may be completely different from the previous set of scanned Bluetooth beacons. For example, the previous set of scanned Bluetooth beacons may include Bluetooth beacon 112 and Bluetooth beacon 110 and the set of latest scanned Bluetooth beacons include Bluetooth beacon 104 and Bluetooth beacon 106.

At 204, the mobile device computes one or more average RSSI values for a predefined number of RSSI value detections associated with one or more Bluetooth beacon within the latest and previous set of scanned Bluetooth beacons. These RSSI value detections are made at predefined time intervals. For example, the predefined time interval may be four seconds and the predefined number of RSSI detections may be four. In this case, an RSSI detection is made after every four seconds till the total number of RSSI detections are four.

In an embodiment, if the number of RSSI value detections for a Bluetooth beacon within the latest and previous set of scanned Bluetooth beacons is below the predefined number of RSSI value detections, then average RSSI value for that Bluetooth beacon is not computed. In other words, that Bluetooth beacon is not considered for further average RSSI value computations. In another embodiment, average RSSI value is computed only for that Bluetooth beacon that is present in both the set of latest scanned Bluetooth beacons and the previous set of scanned Bluetooth beacons, provided that the predefined number of RSSI value detections have been made for that Bluetooth beacon. In an embodiment, an average RSSI value may be computed using arithmetic mean, median, geometric median, mode, geometric mean, harmonic mean, quadratic mean, cubic mean, generalized mean, weighted mean, truncated mean, interquartile mean, and winsorized mean.

The predefined number of RSSI value detections depends on the external parameters, which, for example, may include but are not limited to arrangement of Bluetooth beacons, signal interference, and attenuations in signal strengths due to environmental factors. Thus, based on these external parameters, the number of RSSI value detections that the mobile device is required to take may increase or decrease. For example, when external parameters are absent and there is no negative effect on determination of RSSI values, the number of RSSI detections required may reduce. Alternately, when external parameters have a negative effect on determination of RSSI values, the number of RSSI detections required may increase.

At 206, the mobile device identifies a highest average RSSI value Bluetooth beacon from within the latest and previous set of scanned Bluetooth beacons. The highest average RSSI value Bluetooth beacon has a highest average RSSI value within the one or more average RSSI values computed at 204.

As an example of methods performed at 204 and 206, the previous set of scanned Bluetooth beacons that are scanned at $0^{th}$ sec, $4^{th}$ sec, $8^{th}$ second, includes Bluetooth beacon 108, Bluetooth beacon 110, and Bluetooth beacon 112. The set of latest scanned Bluetooth beacons, scanned at $12^{th}$ second includes Bluetooth beacon 108, Bluetooth beacon 110, and Bluetooth beacon 106. The predefined number of RSSI value detections is fixed at four and the interval for RSSI detections is fixed at four seconds. In this case, the mobile device determines three RSSI values for each of Bluetooth beacon 108, Bluetooth beacon 110, and Bluetooth beacons 112 at $0^{th}$ sec, 4th sec, $8^{th}$ second. At the $12^{th}$ second, the mobile device determines RSSI values for Bluetooth beacon 108, Bluetooth beacon 110, and Bluetooth beacon 106 in the latest set of scanned Bluetooth beacons, as Bluetooth beacon 112 fails detection by the mobile device. Thereafter, the mobile device determines the average RSSI value for one or more Bluetooth beacons, which are represented in Table 1:

TABLE 1

| Bluetooth beacon | $4^{rth}$ RSSI value detection (at $12^{th}$ sec) | $3^{rd}$ RSSI value detection (at $8^{th}$ sec) | $2^{nd}$ RSSI value detection (at $4^{th}$ sec) | $1^{st}$ RSSI value detection (at 0 sec) | Average RSSI value detection |
|---|---|---|---|---|---|
| Bluetooth beacon 108 | −20 dB | −40 dB | −30 dB | −20 dB | −27.5 dB |
| Bluetooth beacon 110 | −40 dB | −60 dB | −50 dB | −60 dB | −52.5 dB |
| Bluetooth beacon 112 | | −60 db | −70 dB | −50 dB | NA |
| Bluetooth beacon 106 | −50 dB | | | | NA |

In this example, average RSSI value is computed only for Bluetooth beacon 108 and Bluetooth beacon 110. Average RSSI value is not computed for Bluetooth beacon 112 as it is not detected in the set of latest scanned Bluetooth beacons. Additionally, average RSSI value is not computed for Bluetooth beacon 106 as the number of RSSI detections is less than the minimum number of RSSI detections, i.e. 4. Thus, in other words, average RSSI value is not computed for a Bluetooth Beacon that is not present in the set of latest scanned Bluetooth beacons. Additionally, average RSSI value is not computed for those Bluetooth beacons for which the minimum number of RSSI value detections has not been met.

Therefore, in the set of latest scanned Bluetooth beacons, Bluetooth beacon 108 has the latest highest RSSI value, i.e., −20 dB. Moreover, in the latest and previous set of scanned Bluetooth beacons as well, Bluetooth beacon 108 has the highest average RSSI value, i.e., −27.5 dB. As a result, Bluetooth beacon 108 is selected as the nearest Bluetooth beacon.

In an exemplary embodiment, at any given time instance, the mobile device may retain four adjacent RSSI value detections made at an interval of four seconds. As a continuation of the example above, such retention of adjacent RSSI value detections may be represented by Table 2 at $16^{th}$ second and Table 3 at $20^{th}$ second:

TABLE 2

| Bluetooth beacon | 5th RSSI value detection (at 16th sec) | 4th RSSI value detection (at 12th sec) | 3rd RSSI value detection (at 8th sec) | 2nd RSSI value detection (at 4th sec) | Average RSSI value detection |
|---|---|---|---|---|---|
| Bluetooth beacon 108 | −50 dB | −20 dB | −40 dB | −30 dB | −35 dB |
| Bluetooth beacon 110 | −10 dB | −40 dB | −60 dB | −50 dB | −40 dB |
| Bluetooth beacon 112 | | | −60 db | −70 dB | NA |
| Bluetooth beacon 106 | −40 dB | −50 dB | | | NA |

Thus, in Table 2, the RSSI value detection at $0^{th}$ second is dropped while the RSSI value detections at 4rth second, $8^{th}$ second, and $12^{th}$ second are retained along with the RSSI value detection at $16^{th}$ second. In this case, Bluetooth beacon 110 has the latest highest RSSI value, i.e., −10 dB and Bluetooth beacon 108 has the highest average RSSI value, i.e., −35 dB. In this case, different Bluetooth beacons have latest highest RSSI value and the highest average RSSI value. Moving on to RSSI value detection at $20^{th}$ second, the RSSI value detections are represented in Table 3:

TABLE 3

| Bluetooth beacon | 6th RSSI value detection (at 20th sec) | 5th RSSI value detection (at 16th sec) | 4th RSSI value detection (at 12th sec) | 3rd RSSI value detection (at 8th sec) | Average RSSI value detection |
|---|---|---|---|---|---|
| Bluetooth beacon 108 | | −50 dB | −20 dB | −40 dB | NA |
| Bluetooth beacon 110 | | −10 dB | −40 dB | −60 dB | NA |
| Bluetooth beacon 112 | | | | −60 db | NA |
| Bluetooth beacon 106 | | −40 dB | −50 dB | | NA |
| Bluetooth beacon 104 | −30 dB | | | | NA |

Thus, in Table 3, the RSSI value detections at $0^{th}$ and $4^{th}$ second are dropped while the RSSI value detections at $8^{th}$, $12^{th}$, and $16^{th}$ second are retained along with the RSSI value detection at $20^{th}$ second. In this case, the set of latest scanned Bluetooth beacons only includes Bluetooth beacon 104. However, Bluetooth beacon 104 does not have four RSSI value detections, which is the minimum number of RSSI value detections required to compute average RSSI value. Thus, no nearest Bluetooth beacon is identified.

In another exemplary embodiment, instead of retaining four adjacent RSSI value detections made at an interval of four seconds at any given time instant, the mobile device flushes out every set of four adjacent RSSI value detections. In this scenario, the flushing out of RSSI value detections may be represented by Table 4 at $16^{th}$ second. Table 4 given below is basically Table 2 from which RSSI value detections at $4^{th}$, $8^{th}$, and $12^{th}$ second have been removed in addition to RSSI value detection at $0^{th}$ second.

TABLE 4

| Bluetooth beacon | 5th RSSI value detection (at 16th sec) | Average RSSI value detection |
|---|---|---|
| Bluetooth beacon 108 | −50 dB | NA |
| Bluetooth beacon 110 | −10 dB | NA |
| Bluetooth beacon 112 | | NA |
| Bluetooth beacon 106 | −40 dB | NA |

Thus, in this case, Average RSSI values will be computed only after RSSI value detections have been made at $20^{th}$, $24^{th}$, and $28^{th}$ second, so as to have four RSSI value detections. Thereafter, these RSSI values are also flushed and RSSI value detections are made at $32^{nd}$, $36^{th}$, $40^{th}$, and $44^{th}$ second to again compute average RSSI values. It will be apparent to a person skilled in the art that the invention is not limited to the above mentioned methods of computing average RSSI values, and may include various other variations and modifications of such methods.

Thereafter, at 208, a nearest Bluetooth beacon is selected from the set of latest scanned Bluetooth beacons and the previous set of scanned Bluetooth beacons. The nearest Bluetooth beacon is selected based on the identifying of the latest highest RSSI value Bluetooth beacon and the identifying of the highest average RSSI value Bluetooth beacon. In other words, after the latest highest RSSI value Bluetooth beacon and the highest average RSSI value Bluetooth beacon have been identified, this information is used to select the nearest Bluetooth beacon. In the above example, in Table 1, Bluetooth beacon 108 is identified both as the latest highest RSSI value Bluetooth beacon and the highest average RSSI value Bluetooth beacon, as Bluetooth beacon 108 has both the latest highest RSSI value, i.e., −20 dB, and the highest average RSSI value i.e., −27.5 dB.

In an embodiment, when the latest highest RSSI value Bluetooth beacon is same as the highest average RSSI value Bluetooth beacon, the latest highest RSSI value Bluetooth beacon is identified as the nearest Bluetooth beacon. By way of an example, Bluetooth beacon 108 is common in the set of latest scanned Bluetooth beacons and the previous set of scanned Bluetooth beacons. Moreover, Bluetooth beacon 108, when it was in the set of latest scanned Bluetooth beacons, had the highest RSSI value, i.e., −20 dB and when it was in the latest and previous set of scanned Bluetooth beacons, had the highest average RSSI value, i.e., −27.5 dB. Thus, in this case, Bluetooth beacon 108 is selected as the nearest Bluetooth beacon. This is further explained in detail in conjunction with FIGS. 3A and 3B.

Alternatively, when the latest highest RSSI value Bluetooth beacon is different from the highest average RSSI value Bluetooth beacon, then a set of possible nearest Bluetooth beacons is predicted based on Bluetooth beacon sequence data, lost-found beacon data, and a set of detected nearest Bluetooth beacons. However, when the set of possible nearest Bluetooth beacons includes either each or none of the latest highest RSSI value Bluetooth beacon and the highest average RSSI value Bluetooth beacon, which are different Bluetooth beacons, the nearest Bluetooth beacon is predicted based on historical Bluetooth beacon data using machine learning techniques. This is further explained in conjunction with FIGS. 3A and 3B.

Figure 3A:
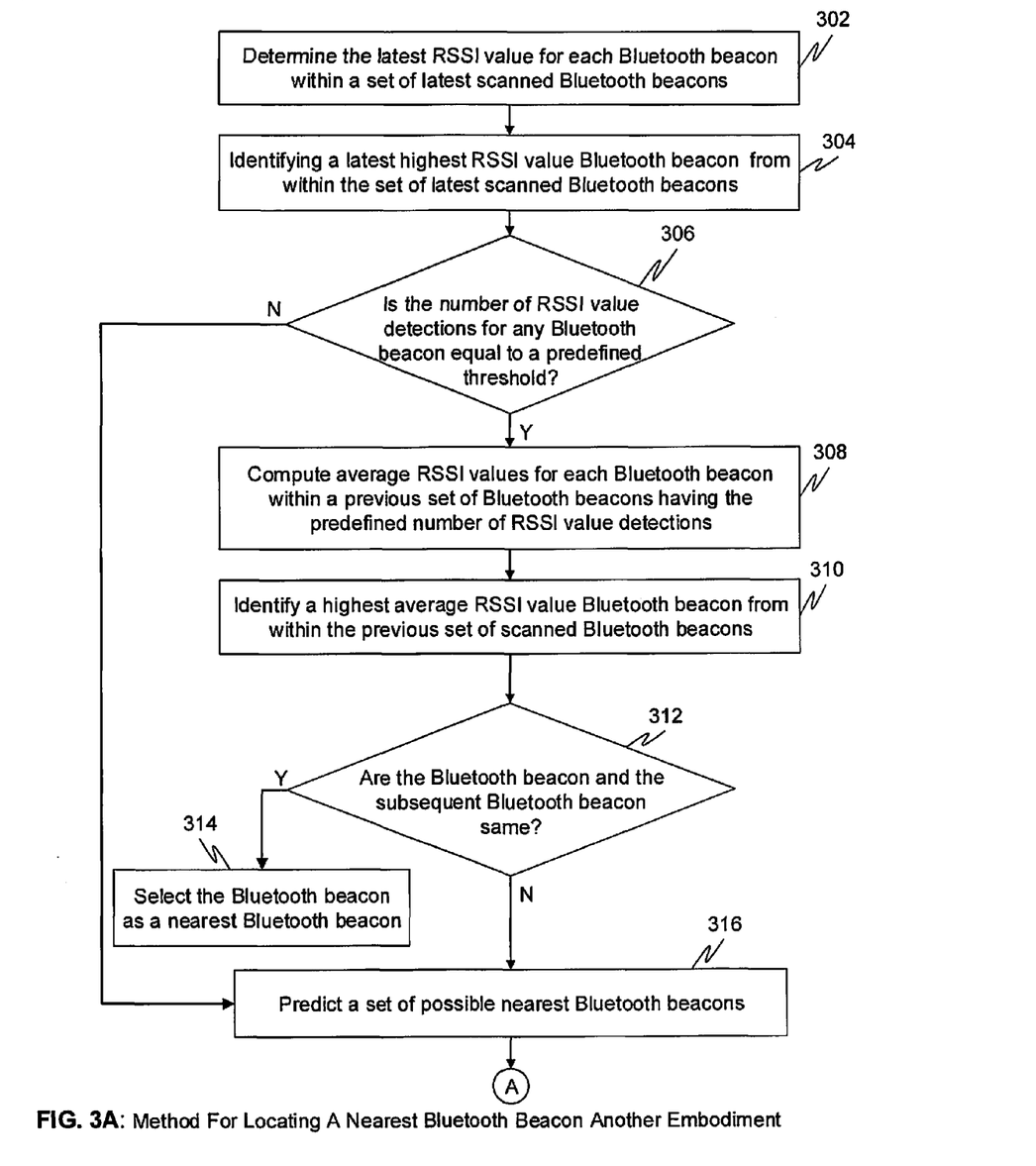
FIGS. 3A and 3B illustrate a flowchart of a method for locating a nearest Bluetooth beacon within a plurality of Bluetooth beacons, in accordance with another embodiment.
Figure 3B:
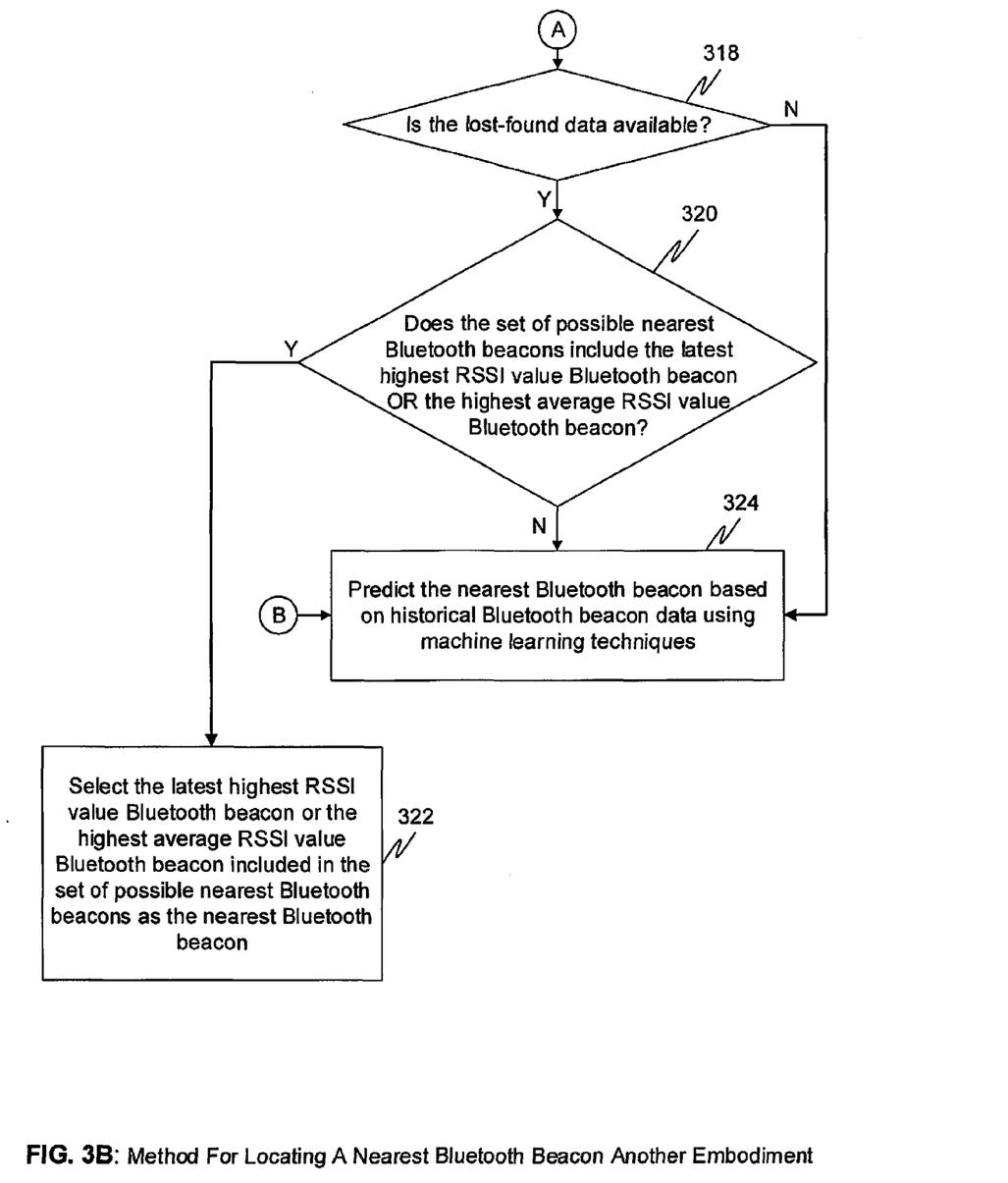

FIGS. 3A and 3B illustrates a flowchart of a method for locating a nearest Bluetooth beacon within a plurality of Bluetooth beacons, in accordance with another embodiment. At 302, the mobile device determines the latest RSSI value for each Bluetooth beacon within the set of latest scanned Bluetooth beacons. At 304, the mobile device identifies a latest highest RSSI value Bluetooth beacon from within the set of latest scanned Bluetooth beacons, which has the highest RSSI value. This has been explained in conjunction with FIG. 2. With reference to the example given in FIG. 2, in Table 1, the mobile device identifies Bluetooth beacon 108 as the Bluetooth beacon for which the latest RSSI value is highest, i.e., −20 dB.

At 306, a check is performed to determine whether the number of RSSI value detections for any Bluetooth beacon within the set of latest scanned Bluetooth beacons is equal to a predefined threshold. The predefined threshold is fixed, such that, the actual RSSI value of a given Bluetooth beacon can be accurately determined. The predefined threshold, for example, may be fixed at four RSSI detections. If the number of RSSI value detections for any Bluetooth beacon is equal to the predefined threshold then, at 308, the mobile device computes average RSSI values for one or more Bluetooth beacon within the latest and previous set of scanned Bluetooth beacons, which have predefined number of RSSI value detections. This has been explained in detail in conjunction with FIG. 2. Thereafter, at 310, the mobile device identifies a highest average RSSI value Bluetooth beacon from within the latest and previous set of scanned Bluetooth beacons. With reference to the example given in Table 1 of FIG. 2, Bluetooth beacon 108 is identified as the Bluetooth beacon having the highest average RSSI value, i.e., −27.5 dB.

At 312, a check is performed to determine whether the latest highest RSSI value Bluetooth beacon identified at 304 is same as the highest average RSSI value Bluetooth beacon. By way of an example, latest RSSI value for Bluetooth beacon 108 is the highest, i.e., −20 dB and the average RSSI value for Bluetooth beacon 108 is also the highest, i.e., −27.5 dB. Thus, in this case, the latest highest RSSI value Bluetooth beacon and the highest average RSSI value Bluetooth beacon are the same, i.e., Bluetooth beacon 108. If the latest highest RSSI value Bluetooth beacon and the highest average RSSI value Bluetooth beacon are the same, at 314, the latest highest RSSI value Bluetooth beacon is selected as the nearest Bluetooth beacon. With reference to the example given in Table 1 of FIG. 2, as Bluetooth beacon 108 has both the latest highest RSSI value as well as the highest average RSSI value, thus Bluetooth beacon 108 is selected as the nearest Bluetooth beacon for the mobile device.

However, referring back to 312, when the latest highest RSSI value Bluetooth beacon and the highest average RSSI value Bluetooth beacon are different, the mobile device or a server, at 316, predicts a set of possible nearest Bluetooth beacons based on Bluetooth beacon sequence data, lost-found beacon data, and a set of detected nearest Bluetooth beacons. The Bluetooth beacon sequence data is representative of arrangement of the plurality of Bluetooth beacons within the area. The Bluetooth beacon sequence data is also termed as the floor map data that includes actual physical placement of Bluetooth beacons within the given area.

The lost-found data includes information associated with lost Bluetooth beacons and newly found Bluetooth beacons. A lost Bluetooth beacon is that which failed detection by a mobile device during subsequent scanning and a newly found Bluetooth beacon is that which was recently detected by the mobile device during scanning. Additionally, the set of detected nearest Bluetooth beacons includes those Bluetooth beacons which have already been identified as nearest Bluetooth beacons by the mobile device or alternative by other mobile devices in the past moving along the same path as the mobile device.

Referring back to 306, if the number of RSSI value detections for none of the Bluetooth beacons within the set of latest scanned Bluetooth beacons is equal to the predefined threshold, then control goes to 316, where the mobile device or the server predicts a set of possible nearest Bluetooth beacons based on Bluetooth beacon sequence data, lost-found beacon data, and a set of detected nearest Bluetooth beacons.

Thereafter, at 318, a check is performed to determine if the lost-found data is available. In other words, it is determined whether the mobile device detects the same set of Bluetooth beacons time and again over a period of time. If the lost-found data is not available, then at 324, the nearest Bluetooth beacon is predicted based on historical Bluetooth beacon data using machine learning techniques. Examples of the machine learning techniques may include but are not limited to decision forest, support vector machine, and regression model. The historical Bluetooth beacon data includes mapping of historical nearest Bluetooth beacons to corresponding latest RSSI values associated with each of the plurality of Bluetooth beacons. In an embodiment, prediction is done based on the historical Bluetooth beacon data in conjunction with a latest scanned set of Bluetooth beacon data.

Referring back to 318, if the lost-found data is available, then a check is performed, at 320, to determine whether the set of possible nearest Bluetooth beacons include the latest highest RSSI value Bluetooth beacon or the highest average RSSI value Bluetooth beacon. If the set of possible nearest Bluetooth beacons includes either of the latest highest RSSI value Bluetooth beacon or the highest average RSSI value Bluetooth beacon, then at 322, the latest highest RSSI value Bluetooth beacon or the highest average RSSI value Bluetooth beacon, whichever is present in the set of possible nearest Bluetooth beacons is selected as the nearest Bluetooth beacon.

Referring back to 320, if the set of possible nearest Bluetooth beacons does not include only one of the latest highest RSSI value Bluetooth beacon or the highest average RSSI value Bluetooth beacon, which means that either it includes both or none of it, then at 324, the nearest Bluetooth beacon is predicted based on historical Bluetooth beacon data using machine learning techniques.

Thus, the method is dynamic and accurate as it is not solely dependent on RSSI values, thereby avoiding chances of erroneous detection of nearest Bluetooth beacons. Additionally, a robust solution is provided that relies on storage and computational capability of a server to detect the nearest Bluetooth beacon. The accuracy of determination of the nearest Bluetooth beacon ultimately results in good customer experience.

Figure 4:
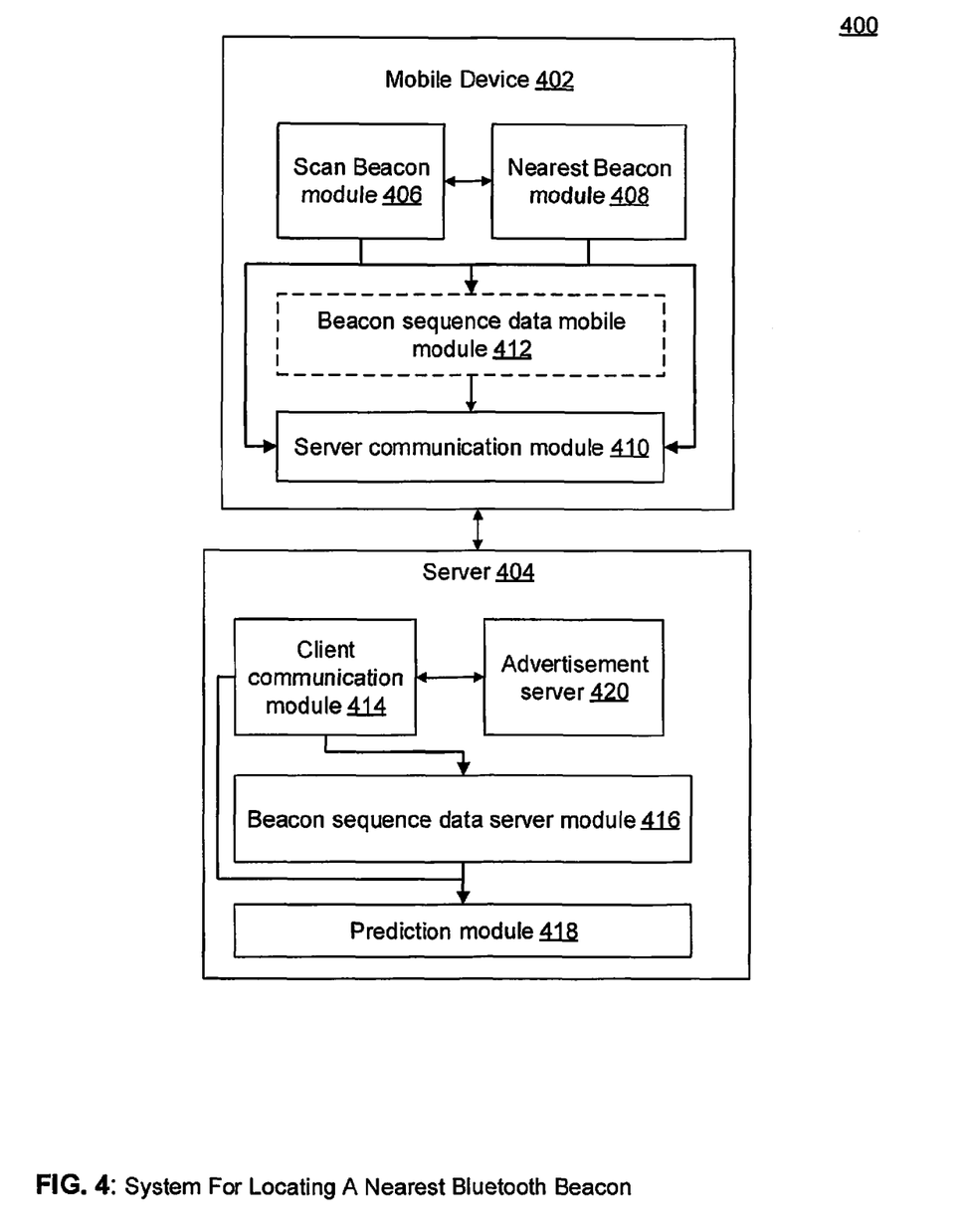
FIG. 4 is a block diagram illustrating a system for locating a nearest Bluetooth beacon within a plurality of Bluetooth beacons, in accordance with an embodiment.

FIG. 4 is a block diagram illustrating a system 400 for locating a nearest Bluetooth beacon within a plurality of Bluetooth beacons, in accordance with an embodiment. System 400 includes a mobile device 402 and a server 404. Mobile device 402 includes a scan beacon module 406, a nearest beacon module 408, a server communication module 410, and a beacon sequence data mobile module 412.

Scan beacon module 406 scans Bluetooth beacons and determines the RSSI values for each Bluetooth Beacon within a set of latest scanned Bluetooth beacons. Thereafter, nearest beacon module 408 identifies a latest highest RSSI value Bluetooth beacon from within the set of latest scanned Bluetooth beacons, which has the highest RSSI value. When mobile device 402 at a previous time interacted with a previous set of scanned Bluetooth beacons, scan beacon module 406 detected a predefined number of RSSI value detections associated with one or more Bluetooth beacon within the previous set of scanned Bluetooth beacons. Thereafter, nearest beacon module 408 computes one or more average RSSI values for the predefined number of RSSI value detections associated with the one or more Bluetooth beacon within the latest and previous set of scanned Bluetooth beacons.

Nearest beacon module 408 identifies a highest average RSSI value Bluetooth beacon from within the latest and previous set of scanned Bluetooth beacons, which has a highest average RSSI value. Thereafter, nearest beacon module 408 determines whether the latest highest RSSI value Bluetooth beacon and the highest average RSSI value beacon are the same. If they are same, nearest beacon module 408 selects the latest highest RSSI value Bluetooth beacon as the nearest Bluetooth beacon. This has been explained in detail in conjunction with FIG. 2.

However, if the latest highest RSSI value Bluetooth beacon and the highest average RSSI value Bluetooth beacon are different, then, in an embodiment, beacon sequence data mobile module 412 may predict a set of possible nearest Bluetooth beacons based on Bluetooth beacon sequence data, lost-found beacon data, and a set of detected nearest Bluetooth beacons. Alternatively, mobile device 402 may communicate information associated with the latest highest RSSI value Bluetooth beacon and the highest average RSSI value Bluetooth beacon to server 404 through server communication module 410 and a client communication module 414 in server 404. Thereafter, based on this information, a beacon sequence data server module 416 predicts a set of possible nearest Bluetooth beacons based on Bluetooth beacon sequence data, lost-found beacon data, and a set of detected nearest Bluetooth beacons.

In case the set of possible nearest Bluetooth beacons includes the latest highest RSSI value Bluetooth beacon or the highest average RSSI value Bluetooth beacon, then nearest beacon module 408 selects either of the latest highest RSSI value Bluetooth beacon or the highest average RSSI value Bluetooth beacon, whichever is present in the set of possible nearest Bluetooth beacons as the nearest Bluetooth beacon. This has been explained in detail in conjunction with FIGS. 3A and 3B. However, in case the set of possible nearest Bluetooth beacons includes both the latest highest RSSI value Bluetooth beacon and the highest average RSSI value Bluetooth beacon. Further, in case the set of possible nearest Bluetooth beacons does not include either of the latest highest RSSI value Bluetooth beacon or the highest average RSSI value Bluetooth beacon. In both the cases, a prediction module 418 predicts the nearest Bluetooth beacon based on historical Bluetooth beacon data using machine learning techniques. The historical Bluetooth beacon data includes mapping of historical nearest Bluetooth beacons to corresponding latest RSSI values associated with each of the plurality of Bluetooth beacons. This has been explained in conjunction with FIGS. 3A and 3B.

In an embodiment, server 404 may include an advertisement server 420 to push contextual advertisements to mobile device 402 based on selection of the nearest Bluetooth beacon. Server 404 may also use user profile data to select contextual advertisements or information to be pushed to mobile device 402. Examples of such contextual advertisements have been explained earlier in conjunction with FIG. 1. It will be apparent to a person skilled in the art that the functionalities performed by various module of mobile device 402 and server 404 may be performed by one or more processors.

Figure 5:
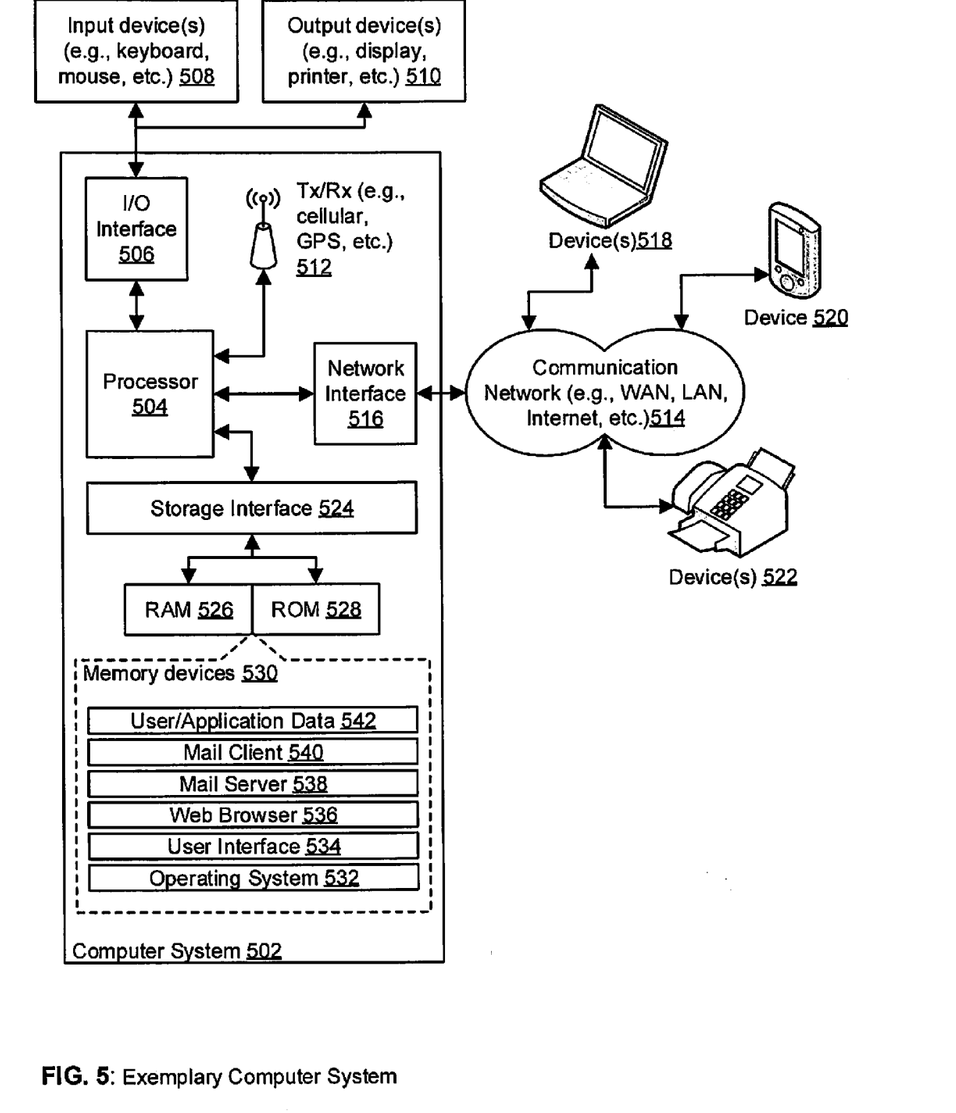
FIG. 5 is a block diagram of an exemplary computer system for implementing various embodiments.

FIG. 5 is a block diagram of an exemplary computer system for implementing various embodiments. Computer system 502 may comprise a central processing unit ("CPU" or "processor") 504. Processor 504 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc.

Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory devices 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 530 may store a collection of program or database components, including, without limitation, an operating system 532, a user interface application 534, a web browser 536, a mail server 538, a mail client 540, a user/application data 542 (e.g., any data variables or data records discussed in this disclosure), etc. Operating system 532 may facilitate resource management and operation of the computer system 502. Examples of operating system 532 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 502 may implement web browser 136 stored program component. Web browser 536 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 502 may implement mail server 538 stored program component. Mail server 538 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement mail client 540 stored program component. Mail client 540 may be a mail viewing application, such as Apple Mail, Microsoft Entourage, Microsoft Outlook, Mozilla Thunderbird, etc.

In some embodiments, computer system 502 may store user/application data 542, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for locating nearest Bluetooth beacons. A latest highest RSSI value Bluetooth beacon associated with a highest RSSI value is identified from within a set of latest scanned Bluetooth beacons. Thereafter, one or more average RSSI values is computed for one or more Bluetooth beacons within a latest and previous set of scanned Bluetooth beacons and a highest average RSSI value Bluetooth beacon is identified from within the latest and previous set of scanned Bluetooth beacons. Based on identification of the latest highest RSSI value Bluetooth beacon and the highest average RSSI value Bluetooth beacon, the nearest Bluetooth beacon is selected. This method is a robust solution as it relies on storage and computational capability of a server to detect the nearest Bluetooth beacon. Moreover, the method is dynamic and accurate as it is not solely dependent on RSSI values, thereby avoiding chances of erroneous detection of a nearest Bluetooth beacon. The accuracy of determination of the nearest Bluetooth beacon results in good customer experience.

The specification has described methods and system for locating nearest Bluetooth beacons. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for locating a nearest Bluetooth beacon within a plurality of Bluetooth beacons, the method comprising:
    identifying a latest highest Received Signal Strength Indication (RSSI) value Bluetooth beacon associated with a highest RSSI value from within a set of latest scanned Bluetooth beacons;
    computing at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons;
    identifying a highest average RSSI value Bluetooth beacon from within the latest and previous set of scanned Bluetooth beacons, the highest average RSSI value Bluetooth beacon being associated with a highest average RSSI value within the at least one average RSSI value; and
    selecting the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

2. The method of claim 1, wherein selecting the nearest Bluetooth beacon comprises determining whether the latest highest RSSI value Bluetooth beacon and the highest average RSSI value Bluetooth beacon are the same.

3. The method of claim 2, wherein the latest highest RSSI value Bluetooth beacon is selected as the nearest Bluetooth beacon, when the latest highest RSSI value Bluetooth beacon and the highest average RSSI value Bluetooth beacon are the same.

4. The method of claim 2 further comprising predicting a set of possible nearest Bluetooth beacons based on Bluetooth beacon sequence data, lost-found beacon data, and a set of detected nearest Bluetooth beacons, when the latest highest RSSI value Bluetooth beacon is different from the highest average RSSI value Bluetooth beacon, the Bluetooth beacon sequence data being representative of arrangement of the plurality of Bluetooth beacons.

5. The method of claim 4, wherein the lost-found data comprises information associated with lost Bluetooth beacons that failed detection by a mobile device and newly found Bluetooth beacons that are recent detections by the mobile device.

6. The method of claim 4 further comprising predicting the nearest Bluetooth beacon based on historical Bluetooth beacon data using machine learning techniques, when at least one predefined criteria is satisfied, the at least one predefined criteria comprising each of the latest highest RSSI value Bluetooth beacon and the highest average RSSI value Bluetooth beacon being present within the set of possible nearest Bluetooth beacons and each of the latest highest RSSI value Bluetooth beacon and the highest average RSSI value Bluetooth beacon being absent in the set of possible nearest Bluetooth beacons, the historical Bluetooth beacon data comprising mapping of historical nearest Bluetooth beacon to corresponding latest RSSI values associated with each of the plurality of Bluetooth beacons.

7. The method of claim 5 further comprising predicting the nearest Bluetooth beacon based on historical Bluetooth beacon data using machine learning techniques, when the lost-found data is not available to predict set of possible nearest Bluetooth beacons, the historical Bluetooth beacon data comprising mapping of historical nearest Bluetooth beacon to corresponding latest RSSI values of each of the plurality of Bluetooth beacons.

8. The method of claim 5 further comprising confirming the selection of the nearest Bluetooth beacon, when the set of possible nearest Bluetooth beacons comprises one of the latest highest RSSI value Bluetooth beacon and the highest average RSSI value Bluetooth beacon.

9. The method of claim 1 further comprising predicting a set of possible nearest Bluetooth beacons based on Bluetooth beacon sequence data, lost-found beacon data, and a set of detected nearest Bluetooth beacons, when number of RSSI value detections for each Bluetooth beacon in the set of latest scanned Bluetooth beacons is below a predefined threshold, the Bluetooth beacon sequence data being representative of arrangement of the plurality of Bluetooth beacons.

10. The method of claim 1, wherein the predefined number of RSSI value detections is determined based on external parameters affecting determination of RSSI values, the external parameters being selected from a group comprising arrangement of the Bluetooth beacons, signal interference, and attenuations in signal strengths due to environmental factors.

11. A mobile device for locating a nearest Bluetooth beacon within a plurality of Bluetooth beacons, the mobile device comprising:
    at least one processor; and
    a computer-readable medium storing instructions that, when executed by the at least one processor, cause the at least one processor to perform operations comprising:
        identifying a latest highest Received Signal Strength Indication (RSSI) value Bluetooth beacon associated with a highest RSSI value from within a set of latest scanned Bluetooth beacons;

computing at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons;

identifying a highest average RSSI value Bluetooth beacon from within the latest and previous set of scanned Bluetooth beacons, the highest average RSSI value Bluetooth beacon being associated with a highest average RSSI value within the at least one average RSSI value; and selecting the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

12. The mobile device of claim 11, wherein the selecting operation further comprise determining whether the latest highest RSSI value Bluetooth beacon and the highest average RSSI value Bluetooth beacon are the same.

13. The mobile device of claim 12, wherein the latest highest RSSI value Bluetooth beacon is selected as the nearest Bluetooth beacon, when the latest highest RSSI value Bluetooth beacon and the highest average RSSI value Bluetooth beacon are same.

14. The mobile device of claim 12, wherein the operations further comprise predicting a set of possible nearest Bluetooth beacons based on Bluetooth beacon sequence data, lost-found beacon data, and a set of detected nearest Bluetooth beacons, when the latest highest RSSI value Bluetooth beacon is different from the highest average RSSI value Bluetooth beacon, the Bluetooth beacon sequence data being representative of arrangement of the plurality of Bluetooth beacons.

15. The mobile device of claim 14, wherein the lost-found data comprises information associated with lost Bluetooth beacons that failed detection by a mobile device and newly found Bluetooth beacons that are recent detections by the mobile device.

16. The mobile device of claim 14, wherein the operations further comprise predicting the nearest Bluetooth beacon based on historical Bluetooth beacon data using machine learning techniques, when at least one predefined criteria is satisfied, the at least one predefined criteria comprising each of the latest highest RSSI value Bluetooth beacon and the highest average RSSI value Bluetooth beacon being present within the set of possible nearest Bluetooth beacons and each of the latest highest RSSI value Bluetooth beacon and the highest average RSSI value Bluetooth beacon being absent in the set of possible nearest Bluetooth beacons, the historical Bluetooth beacon data comprising mapping of historical nearest Bluetooth beacon to corresponding latest RSSI values associated with each of the plurality of Bluetooth beacons.

17. The mobile device of claim 14, wherein the operations further comprise predicting the nearest Bluetooth beacon based on historical Bluetooth beacon data using machine learning techniques, when the lost-found data is not available to predict set of possible nearest Bluetooth beacons, the historical Bluetooth beacon data comprising mapping of historical nearest Bluetooth beacon to corresponding latest RSSI values of each of the plurality of Bluetooth beacons.

18. The mobile device of claim 14, wherein the operations further comprise confirming the selection of the nearest Bluetooth beacon, when the set of possible nearest Bluetooth beacons comprises one of the latest highest RSSI value Bluetooth beacon and the highest average RSSI value Bluetooth beacon.

19. The mobile device of claim 14, wherein the operations further comprise predicting a set of possible nearest Bluetooth beacons based on Bluetooth beacon sequence data, lost-found beacon data, and a set of detected nearest Bluetooth beacons, when number of RSSI value detections for each Bluetooth beacon in the set of latest scanned Bluetooth beacons is below a predefined threshold, the historical Bluetooth beacon data comprising mapping of historical nearest Bluetooth beacon to corresponding latest RSSI values of each of the plurality of Bluetooth beacons.

20. A system for locating a nearest Bluetooth beacon within a plurality of Bluetooth beacons, the system comprising:

a mobile device configured to:
identify a latest highest Received Signal Strength Indication (RSSI) value Bluetooth beacon associated with a highest RSSI value from within a set of latest scanned Bluetooth beacons;

compute at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons;

identify a highest average RSSI value Bluetooth beacon from within the latest and previous set of scanned Bluetooth beacons, the highest average RSSI value Bluetooth beacon being associated with a highest average RSSI value within the at least one average RSSI value; and select the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon; and a server in communication with the mobile device configured to:
predict a set of possible nearest Bluetooth beacons based on Bluetooth beacon sequence data, lost-found beacon data, and a set of detected nearest Bluetooth beacons, when the latest highest RSSI value Bluetooth beacon is different from the highest average RSSI value Bluetooth beacon, the Bluetooth beacon sequence data being representative of arrangement of the plurality of Bluetooth beacons.

21. The system of claim 20, wherein the server is further configured to predict the nearest Bluetooth beacon based on historical Bluetooth beacon data using machine learning techniques, when at least one predefined criteria is satisfied, the at least one predefined criteria comprising each of the latest highest RSSI value Bluetooth beacon and the highest average RSSI value Bluetooth beacon being present within the set of possible nearest Bluetooth beacons and each of the latest highest RSSI value Bluetooth beacon and the highest average RSSI value Bluetooth beacon being absent in the set of possible nearest Bluetooth beacons, the historical Bluetooth beacon data comprising mapping of historical nearest Bluetooth beacon to corresponding latest RSSI values associated with each of the plurality of Bluetooth beacons.

22. A non-transitory computer-readable storage medium for locating a nearest Bluetooth beacon within a plurality of Bluetooth beacons, when executed by a computing device, cause the computing device to:
   identify a latest highest Received Signal Strength Indication (RSSI) value Bluetooth beacon associated with a highest RSSI value from within a set of latest scanned Bluetooth beacons;
   compute at least one average RSSI value for a predefined number of RSSI value detections associated with at least one Bluetooth beacon within a latest and previous set of scanned Bluetooth beacons, wherein the at least one Bluetooth beacon is common in the set of latest scanned Bluetooth beacons and the previous set of scanned Bluetooth beacons;
   identify a highest average RSSI value Bluetooth beacon from within the latest and previous set of scanned Bluetooth beacons, the highest average RSSI value Bluetooth beacon being associated with a highest average RSSI value within the at least one average RSSI value; and
   select the nearest Bluetooth beacon, from the set of latest scanned Bluetooth beacons and the previous set of scanned Bluetooth beacons, based on the identifying of the latest highest RSSI value Bluetooth beacon and the identifying of the highest average RSSI value Bluetooth beacon.

* * * * *